(12) United States Patent
Tangeland et al.

(10) Patent No.: US 9,800,931 B1
(45) Date of Patent: Oct. 24, 2017

(54) ADAPTIVE SCREEN LAYOUT FOR VIDEO CONFERENCING

(71) Applicant: Cisco Technology, Inc., San Jose, CA (US)

(72) Inventors: Kristian Tangeland, Oslo (NO); Kristian Magnus Hage Østensen, Oslo (NO); Jochen Christof Schirdewahn, Stabekk (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/176,713

(22) Filed: Jun. 8, 2016

(51) Int. Cl.
*H04N 7/15* (2006.01)
*H04N 21/443* (2011.01)
*H04N 7/14* (2006.01)
*H04N 21/4788* (2011.01)
*H04N 21/422* (2011.01)

(52) U.S. Cl.
CPC ......... *H04N 21/4438* (2013.01); *H04N 7/142* (2013.01); *H04N 7/15* (2013.01); *H04N 21/42224* (2013.01); *H04N 21/4788* (2013.01)

(58) Field of Classification Search
CPC ............ H04N 7/14; H04N 7/142; H04N 7/15; H04N 7/152; H04N 7/147
USPC ........................................... 348/14.01–14.16
See application file for complete search history.

(56) References Cited

U.S. PATENT DOCUMENTS

| 8,698,873 | B2 | 4/2014 | Barrus |
| 8,982,177 | B2 | 3/2015 | Modai et al. |
| 9,001,183 | B2 | 4/2015 | Mauchly |
| 9,219,878 | B2 | 12/2015 | Robinson et al. |
| 2007/0156813 | A1* | 7/2007 | Galvez ............... C07K 16/286 709/204 |
| 2013/0304615 | A1 | 11/2013 | Gold |
| 2014/0365620 | A1* | 12/2014 | Lindberg .............. H04L 65/60 709/219 |
| 2015/0085065 | A1* | 3/2015 | Sun ....................... H04N 7/142 348/14.08 |

* cited by examiner

*Primary Examiner* — Melur Ramakrishnaiah
(74) *Attorney, Agent, or Firm* — Edell, Shapiro & Finnan, LLC

(57) ABSTRACT

Adaptively adjusting the layout of a video conference includes receiving, at a first video conference endpoint, a video stream from a second video conference endpoint. Activity in an environment of the first video conference endpoint or an environment of the second video conference endpoint is detected with at least one physical activity sensor. Based on the detected activity, a presentation of the video stream at the first video conference endpoint is dynamically adjusted.

20 Claims, 11 Drawing Sheets

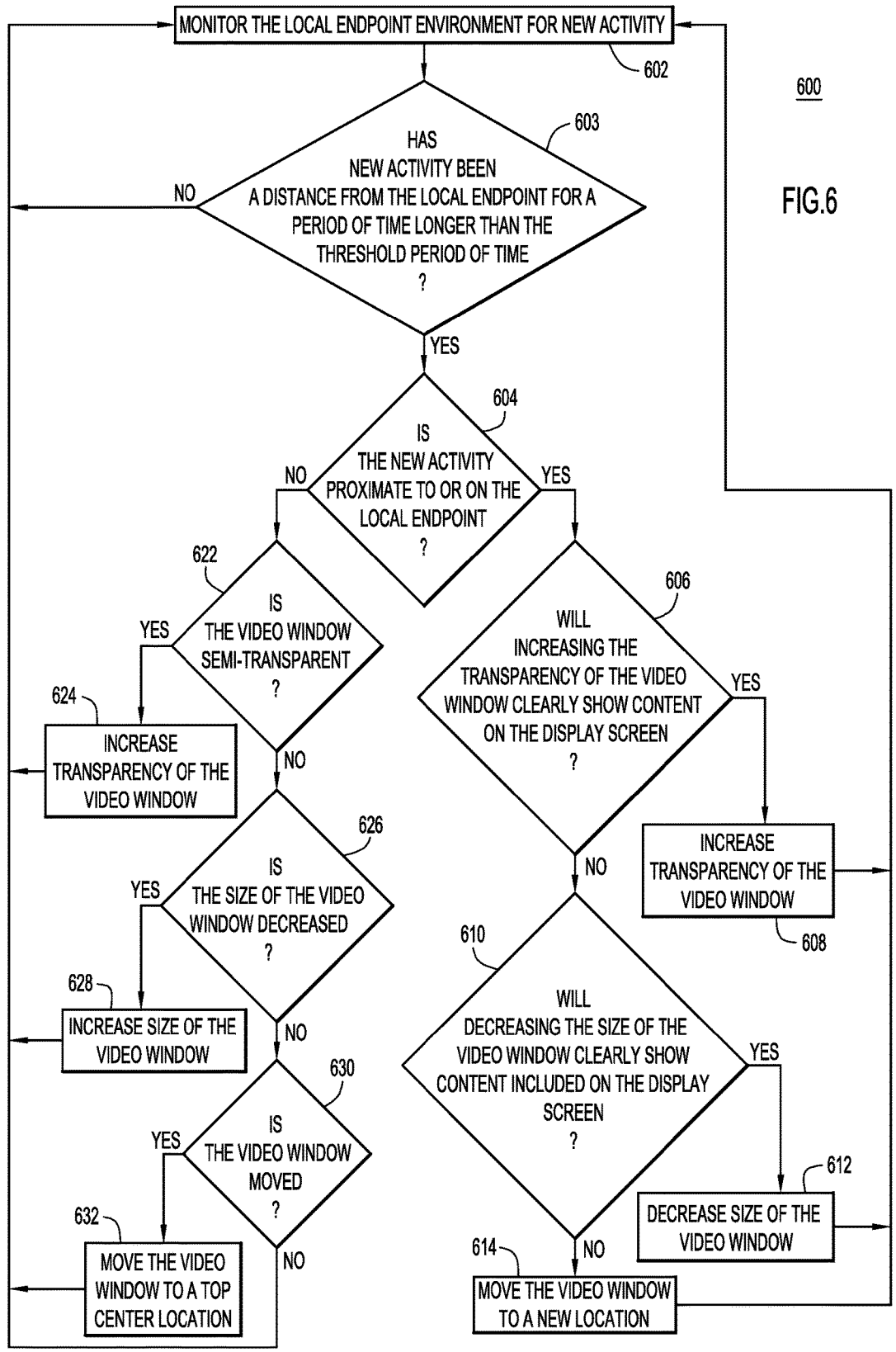

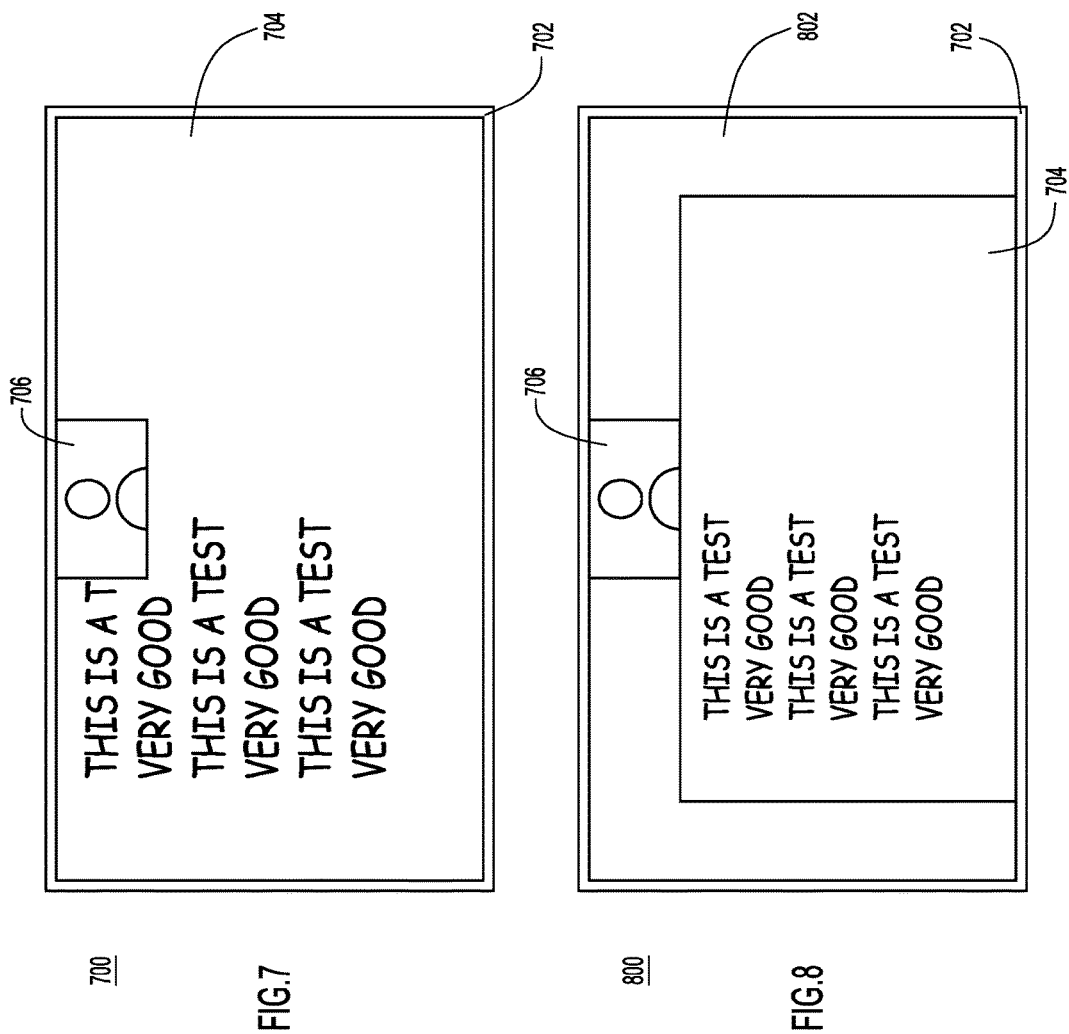

ADAPTIVE SCREEN LAYOUT FOR VIDEO CONFERENCING

TECHNICAL FIELD

The present disclosure relates to video conference systems.

BACKGROUND

Video conference systems, sometimes referred to as videoconference, teleconference, telepresence, or collaboration systems, allow meetings between persons or groups of people at different locations. Video conference systems may include equipment configured to allow the persons or groups of people to communicate by at least simultaneous two-way video and/or audio transmissions. Additionally, video conference systems may allow participants in a session (e.g., a meeting) to converse via audio and/or video transmissions while sharing content, such as writing or drawing on an electronic whiteboard, and/or other such materials.

Certain video conference systems include endpoints that are equipped with multiple cameras and displays that are configured to capture and present, respectively, different video streams. Some endpoints may also track various participants, such as talking participants, and follow the tracked participants with a camera. The video streams can be classified as participant streams (e.g., video captured by cameras and containing views of meeting participants) or data content streams (e.g., whiteboard content). During some meetings, a data content stream may be displayed on a display together with a participant stream.

BRIEF DESCRIPTION OF THE DRAWINGS

FIG. 6 is a flowchart depicting operations for dynamically adjusting the presentation of a video stream, according to another example embodiment.

FIG. 7 illustrates an example whiteboard displaying a participant stream together with whiteboard content, according to an example embodiment.

FIG. 8 illustrates the whiteboard of FIG. 7 displaying a participant stream together with whiteboard content that has been adjusted in accordance with conventional techniques.

DESCRIPTION OF EXAMPLE EMBODIMENTS

Overview

Figure 1:
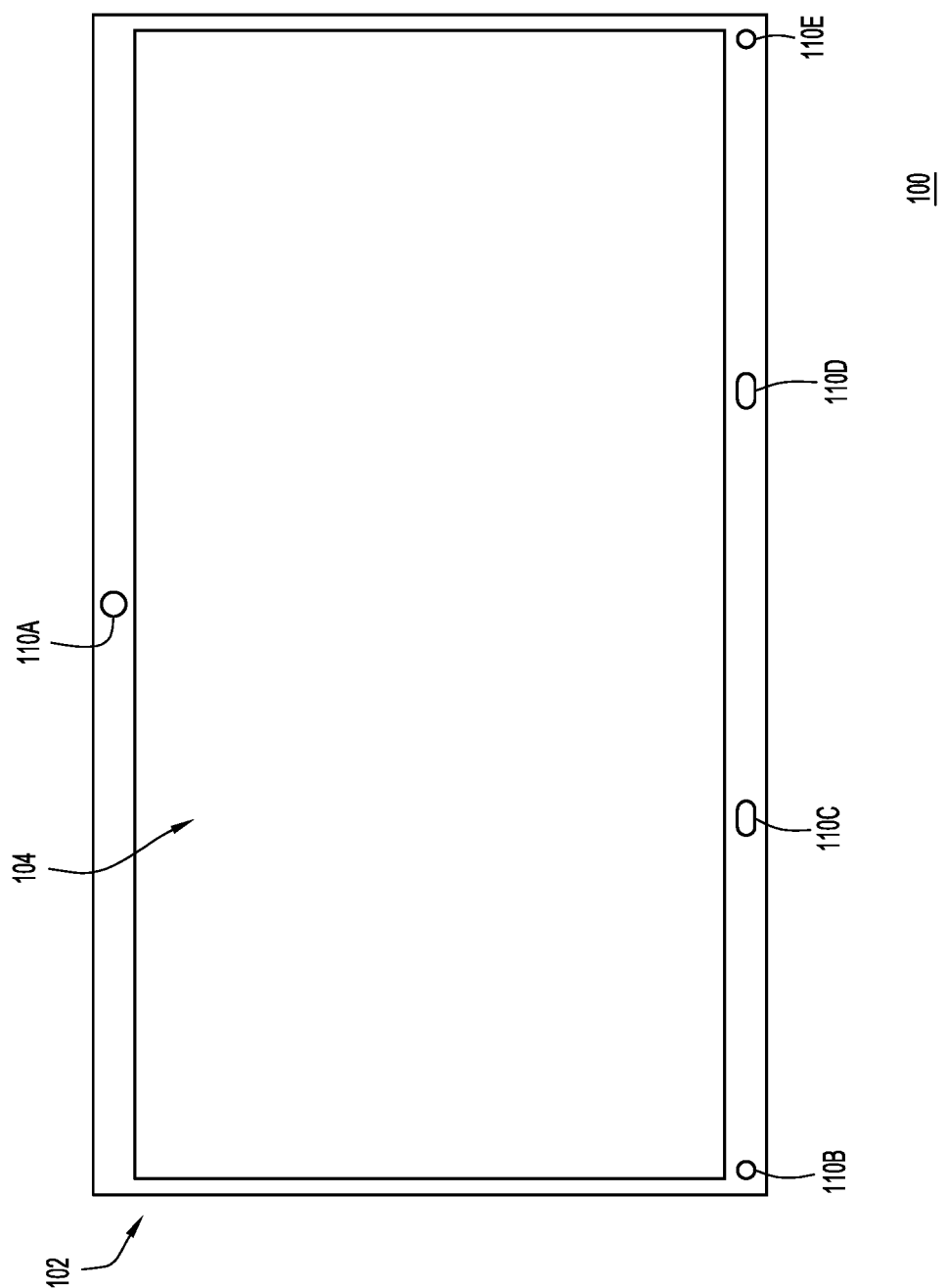
FIG. 1 is a front perspective view of an endpoint for providing adaptive screen layout for video conferencing, according to an example embodiment.

Techniques are provided herein for providing an adaptive screen layout for video conferencing. These techniques may be embodied as a method, an apparatus, and instructions in a computer-readable storage media to perform the method. According to one example embodiment, the techniques include receiving, at a first video conference endpoint, a video stream from a second video conference endpoint. Activity in an environment of the first video conference endpoint or an environment of the second video conference endpoint is detected with at least one physical activity sensor. Based on the detected activity, a presentation of the video stream at the first video conference endpoint is dynamically adjusted.

Example Embodiments

Presented herein are techniques for providing an adaptive screen layout for video conferencing. The techniques automatically adjust a screen layout based on various inputs, such as audio input, proximity input, image inputs, and inputs from a display of a video conference endpoint. The automatic adjustments allow users at the video conference endpoint (referred to herein as local users) to use the entire screen of the video conference endpoint's display screen during collaborative activity (referred to herein as whiteboarding activity) by adjusting a video window that is displaying a video stream from a remote endpoint. Then, if local participants move away from whiteboarding activity, become passive participants in a video conference, or otherwise are focused on the video window, the video window may be incrementally and unobtrusively adjusted to provide a clear view of the video window. Additionally or alternatively, if remote participants add content to a shared screen (e.g., annotate collaborative content), the local video window may be adjusted incrementally and unobtrusively adjusted to provide a clear view of the added content and the video window. The adjustments to the video window may involve changes to the transparency of the video window, changes to the size of the video window, and/or moving the window to different portions of a display screen.

In order to describe the camera presented herein, terms such as "left," "right," "top," "bottom," "front," "rear," "side," "height," "length," "width," "upper," "lower," "interior," "exterior," "inner," "outer," "depth," and the like as may be used. However, it is to be understood that these terms merely describe points of reference and do not limit the present invention to any particular orientation or configuration. For example, the terms "right" and "left" may be used to describe certain embodiments presented herein, but it is to be understood that these terms are not intended to limit the camera system presented herein to a single orientation. Instead, the system presented herein, or portions thereof, may be oriented in any a number of orientations. Thus, even if a certain feature is described herein as being oriented on the "right," it may be understood that this feature may be oriented on the "left" when the system is manually adjusted into a different orientation.

Reference is first made to FIG. 1, which shows an example embodiment of a video conference endpoint 100, according to the present invention. The video conference endpoint 100 includes a display 102 with a display screen 104 and one or more sensors 110A-E. The display screen 104 may include an electronic whiteboard or other such collaborative display. Similarly, the sensors 110A-E may be any suitable sensors, including microphones, microphone arrays (or portions thereof), motion sensors, proximity sensors (ultrasound, infrared, radar, or alike), cameras, etc. and are configured to collectively monitor a space or environment in which the video conference endpoint 100 is disposed. Consequently, the display screen 104 (or the display 102 itself) and the one or more sensors 110A-E may be referred to herein as physical activity sensors. As one example, sensor 110A may be an image sensor, sensors 110B and 110E may be microphones and sensors 110C and 110D may be proximity sensors. Additionally or alternatively, the display screen 104 may be configured to detect writing or drawing on the display screen 104 and/or may include embedded sensors configured to detect writing or drawing on the display screen 104. For example, the display screen 104 may be a touch screen display that detects and records touches. Additionally or alternatively, image analysis may be used to analyze where information is placed on the display screen 104.

In embodiments with an image sensor (e.g., a camera or a portion thereof), the image sensor may be centered above the display screen 104 (e.g., where sensor 110A is shown). Positioning an image sensor centered above the display screen 104 may most effectively capture images of users who are interacting with the display 102 and encourage eye contact between users at different endpoints, at least because content is most frequently displayed or added (e.g., written or drawn) at a top-center portion of the display screen 104. Meanwhile, embodiments with microphones and proximity sensors may include these sensors below or around the display screen 104. Including a plurality of microphones (e.g., an array of microphones) and a plurality of proximity sensors beneath and/or around the display screen 104 may provide wide audio and proximity coverage and allow for efficient speaker tracking and movement detection, respectively.

Figure 2:
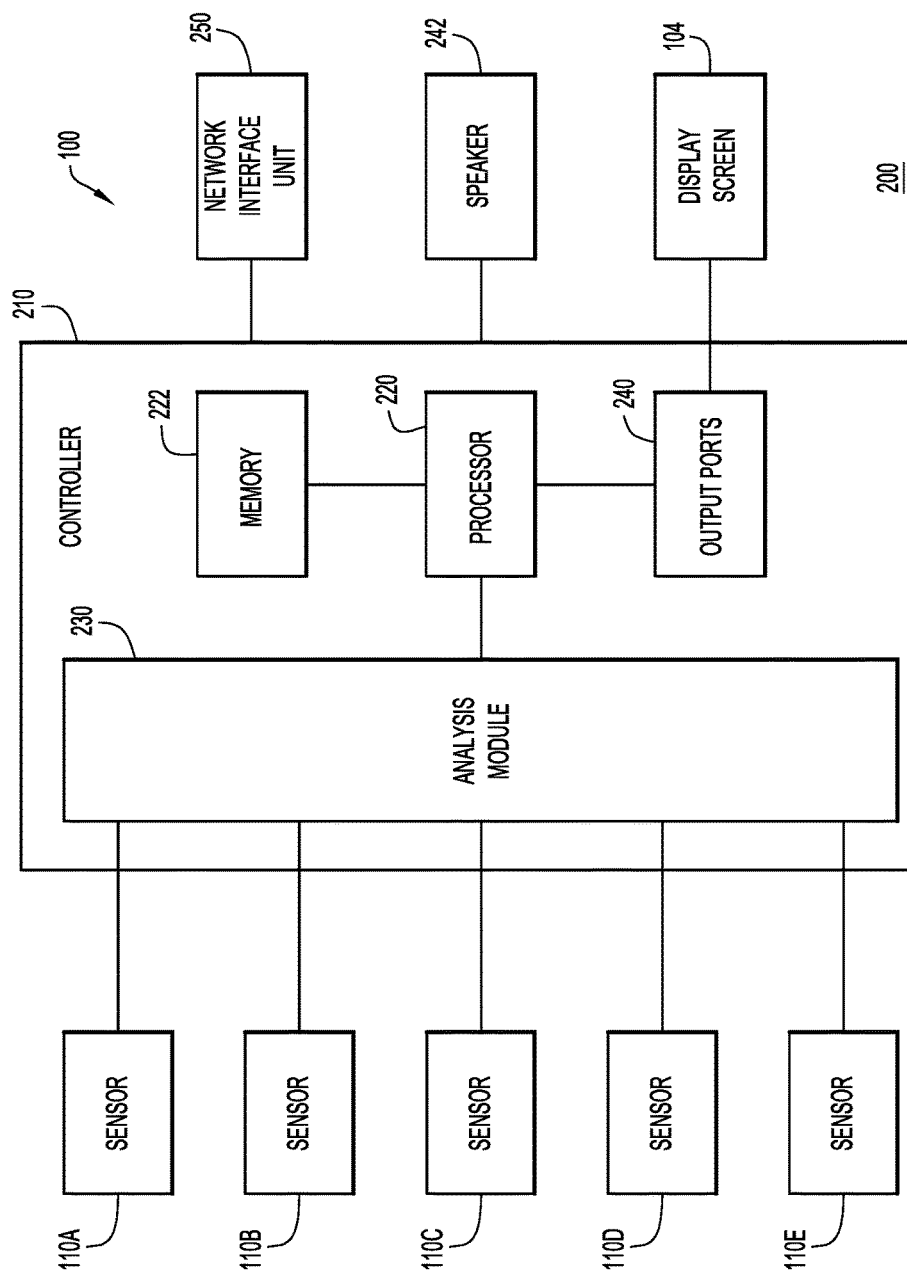
FIG. 2 is a block diagram of the system of FIG. 1, according to an example embodiment.

Now referring to FIG. 2, a block diagram 200 of an example embodiment of video conference endpoint 100 according to an embodiment is shown. Reference is also made to FIG. 1 for purposes of the description of FIG. 2. In this particular embodiment, the video conference endpoint 100 includes five physical activity sensors (sensor 110A-E) operatively coupled to a controller 210. The controller 210 includes a processor 220, an analysis module 230, and various output ports 240. In one example, the functions of the processor 220 and the analysis module 230 may be implemented by fixed or programmable digital logic gates (e.g., in a programmable gate array). Alternatively, the functions of the controller 210 may be implemented by software stored in a memory 222 that, when executed, causes the processor 220 to perform the operations described herein for the controller 210. The controller 210 is operatively coupled to a speaker 242, the display screen 104 (which may also be or include one or more physical activity sensors), and a network interface unit 250 that enables network communication.

In some embodiments, the controller 210 may include processing pipelines configured to receive high resolution video signals from each of image sensors included in sensors 110A-E and convert these signals into a video stream to be output to another video conferencing endpoint. The pipelines may also include croppers and scalers that can digitally process video signals provided by the image sensors included in sensors 110A-E. Additionally or alternatively, the controller may include decoders or coders to facilitate the transmission and receipt of video streams (including participant streams and data streams) during a video conference session. The analysis module 230, based on instructions from the processor 220, performs analysis of sensor input to detect where in a scene people are sitting, moving, and to otherwise detect activity on or proximate to a display screen of a video conference system. For example, the analysis module 230 may determine who is speaking in order to find a presenter and/or detect a point to a display screen to determine that a certain portion of a whiteboard is particularly relevant.

Generally, memory 222 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 222 is or includes one or more tangible (non-transitory) computer readable storage media (e.g., a memory device) encoded with software comprising computer executable instructions. For example, memory 222 may store instructions that may be executed by processor 220 for performing tasks associated with analyzing sensor input and adjusting the display of content on the display screen 104, as described herein.

Figure 3:
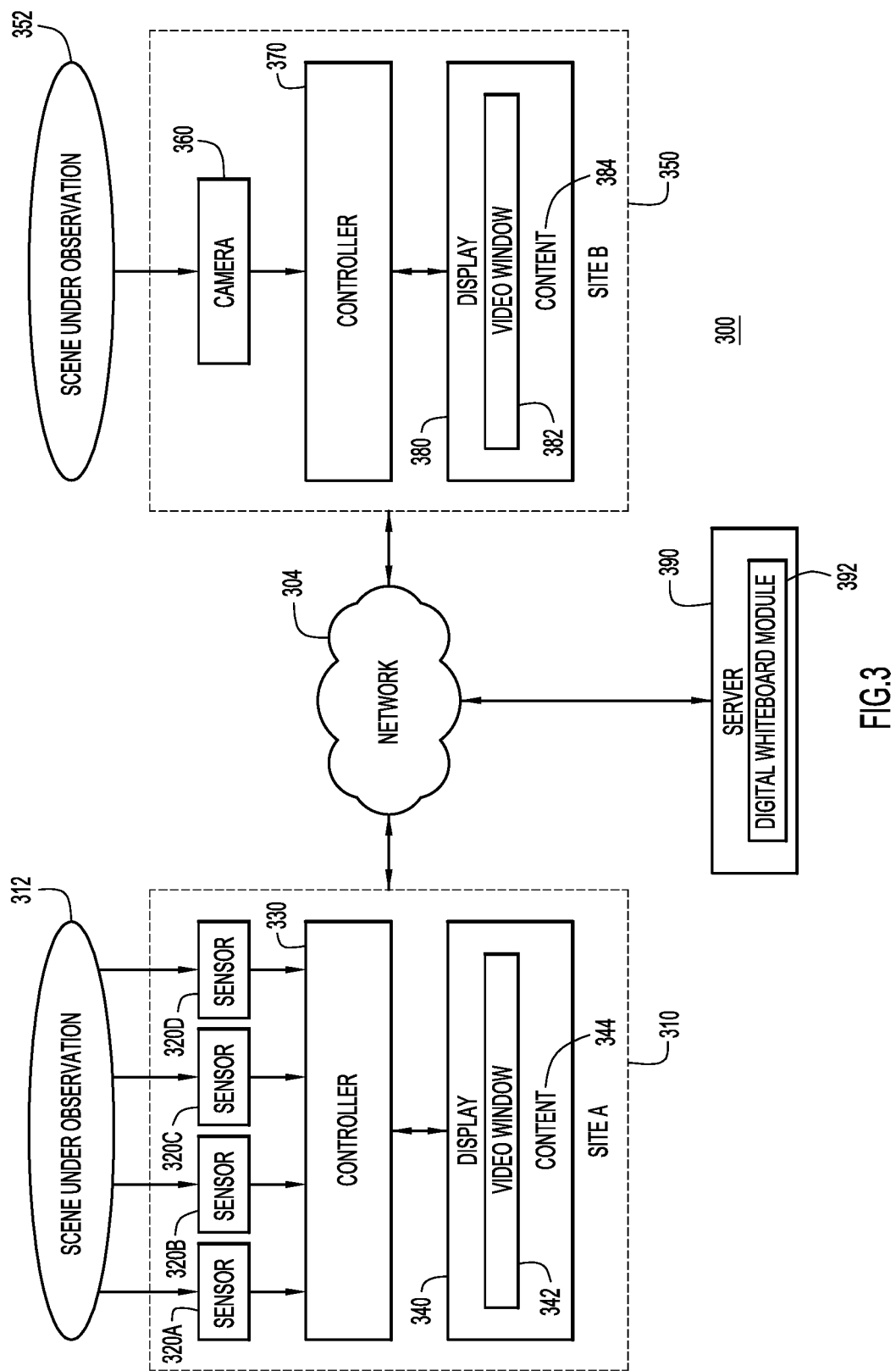
FIG. 3 is a block diagram of a computing environment in which the system of FIG. 1 may operate, according to an example embodiment.

Now referring to FIG. 3, but with continued reference to FIGS. 1 and 2, a block diagram 300 illustrating example embodiments in which two endpoints are participating in a videoconferencing session is now described. The block diagram 300 also illustrates the paths of data (e.g., sensor signals, video signals/streams, and data signals/streams) produced by sensors/displays and processed by a video conference system. Generally, during a video conference session, video streams (data and participant) may be generated by each endpoint participating in the session and transmitted between the endpoints. Consequently, in FIG. 3, a video conference endpoint 310 at site A, which incorporates components to implement the techniques described herein, is shown in communication with a video conference endpoint 350 at site B via a network 304, which may be any network, such as the Internet. However, this configuration is merely exemplary and in other embodiments, a video conference session may include any number of sites with any number of video conferencing endpoints and/or content presentation devices communicating via any protocols or intermediate components now known or hereinafter developed. Moreover, any number of video conferencing endpoints participating in a video conferencing session may include any number of sensors and may implement the techniques presented herein.

Since the video conference endpoint 310 at site A includes components and logic configured to implement video conferencing techniques disclosed herein, video conference endpoint 310 includes physical activity sensors 320A-D (which may be the same as at least a portion of sensors 110A-E from FIG. 2) configured to capture a local scene 312 at site A. The video conference endpoint 310 also includes a controller 330 (which may be the same as controller 210 from FIG. 2) and a display 340 configured to communicate with the controller 330 to transmit or receive a video stream (e.g., the display 340 may act as a physical activity sensor while also displaying a video stream). Meanwhile, the video conferencing endpoint 350 at site B simply includes a camera 360 configured to capture a scene 352 at site B, a controller 370, and a display 380 configured to communicate with the controller 330 to transmit or receive a video stream (e.g., the display 340 may act as a physical activity sensor while also displaying a video stream).

Display 340 and display 380 are each configured to display content of any form now known or hereinafter developed, such as writings, drawings, videos, pictures, etc. In some embodiments, the content 344 on the display 340 and the content 384 displayed on the display 380 is local content, such as writing, drawings, and/or annotations on a local whiteboard. Additionally or alternatively, display 340 and display 380 may be or provide "digital whiteboards" so that site A and site B may collaborate on the same content. As an example, in some embodiments, controller 330 and 370 may each transmit signals to a server 390 with a digital whiteboarding module 392 configured to combine the signals so that the site A and site B may collaborate on the same content via a "digital whiteboard." When two (or more) sites are collaborating via a digital whiteboard, the same content may be displayed on each display, such that content 344 is the same as content 384 and any annotations (e.g., writing or drawing) made on display 340 or display 380 are shown on both display 340 and display 380 (as part of content 344 or content 384, respectively). Additionally or alternatively, a display may, in essence, be divided or partitioned into any number of sections or portions so that a portion of a display (e.g., a right half) may display content from a first source (e.g., a collaborative digital whiteboard) while another portion (e.g., a left half) displays content from another source (e.g., local content, such as slides, videos, research, etc. or another collaborative digital whiteboard).

Regardless of how content 344 and content 384 is managed and/or controlled, during a video conference session, the controller 330 processes signals/feeds received from at least some of the sensors 320A-D (e.g., the image sensors) and display 340, converts at least some of these signals into a video stream (e.g., a participant stream and/or data stream), and transmits the video stream to Site B. Meanwhile, the controller 370 processes signals/feeds received from camera 360 and display 380, converts at least some of these signals into a video stream and transmits the video stream to Site A. When a video stream (e.g., a data stream or participant stream) is received from a remote endpoint (referred to herein as a "remote video stream"), the remote video stream is displayed in a video window on the local display. The video window is displayed together with any content included on (or subsequently added to) the display (e.g., content 344 or content 384), so that local participants can, for example, simultaneously see content from a digital whiteboard and a remote video stream (e.g., a video stream of remote participants).

For example, in the depicted embodiment, a participant stream of participants in scene 352 may be received by endpoint 310 (from endpoint 350) and displayed in a video window 342 on the display 340 of endpoint 310. Similarly, a participant stream of participants in scene 312 may be received by endpoint 350 (from endpoint 310) and displayed in a video window 382 on the display 380. Video window 342 and video window 382 may each be initially displayed in the top, center of their respective displays, together with any local content already on the display (e.g., drawings or writings on an electronic whiteboard). However, as is described in further detail below, when a remote video stream (e.g., a data stream or participant stream from endpoint 350) is received at the video conference endpoint 310, the techniques herein may dynamically adjust the placement, size, transparency, or other such attributes of the video window 342 in order to dynamically adjust a presentation of the video stream. As is explained in detail below, the adjustments may be made in view of physical activity detected on display 340, on display 380, and/or in scene 312. By comparison, a conventional video conferencing endpoint, such as the video conferencing endpoint 350 shown at Site B, may simply display a remote video stream in a video window 382 disposed at a fixed location.

However, as mentioned above, the embodiment depicted in block diagram 300 is merely an example. In other embodiments, an endpoint may receive video streams from any number of remote endpoints. In these embodiments, each video stream may be displayed on the endpoint in a separate window, the video window may be divided, and/or the video window may alternate which stream it presents (e.g., based on detection of an active speaker). When multiple video windows are displayed on an endpoint, each video window may be dynamically adjusted in accordance with the techniques presented herein (e.g., based on detected activity). Moreover, in other embodiments, the video window need not display an actual video stream and may display any desirable feed or signal, such as a data content stream being exchanged in an html format.

Figure 4:
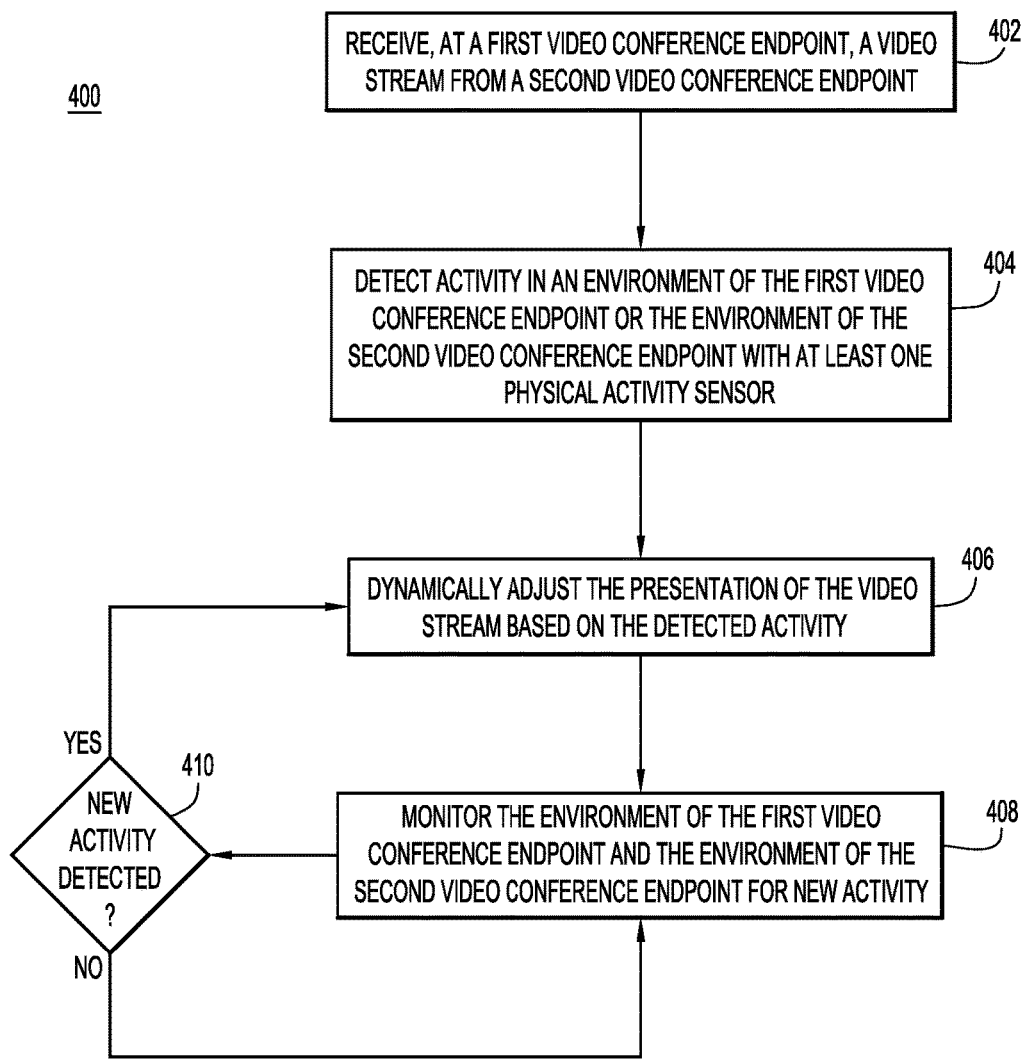
FIG. 4 is a high-level flowchart depicting operations performed in providing adaptive screen layout for video conferencing, according to an example embodiment.

Now referring to FIG. 4, but with continued reference to FIGS. 1, 2, and 3, a high-level flow chart 400 depicting operations performed by the processor 220, or at least based on instructions from the processor 220, is now described, according to an example embodiment. Initially, at step 402, the processor 220 of a first video conference endpoint receives a video stream from a second video conference endpoint that is remote from the first video conference endpoint. The video stream may be a participant stream showing participants disposed in a space adjacent a remote video conference endpoint and/or a data stream showing content displayed on the display of a remote video conference endpoint.

At step 404, input is received from at least one physical activity sensor that is monitoring an environment of the first video conference endpoint or an environment of the second video conference endpoint. The input is provided by at least one of a proximity sensor, a microphone, a camera, and a display and provides data that can be analyzed (e.g., by analysis module 230) to determine the activities that are occurring at the first and/or second endpoints. Put another way, at step 404, activity is detected in an environment of the first video conference endpoint or an environment of the second video conference endpoint with the at least one physical activity sensor.

As an example, a proximity sensor may detect when a person is standing at the display screen, standing close to the display screen, and/or moving towards/away from the display screen. The microphone (or microphone array) may detect the location of a speaker, the volume of sound in the local endpoint's environment, or other such sound-related items. The camera may provide a video stream that allows the analysis module to determine the location and position of participants in the local endpoint's environment (e.g., sitting, standing, lecturing, pointing at the display screen, etc.). Still further, the display may be able to detect a level of activity on the display, such as by detecting pressure on the display (e.g., from touches with a body part or writing implement), virtual reality equipment associated with the display, pointers associated with the display or any other human mechanism for interacting with the display. As a more specific example, the display at each endpoint may include pressure sensors configured to detect and track writings, drawings, or other such markings that provide an indication of writing activity on a digital whiteboard.

Based on the input received at step 404, the presentation of the video stream (received at step 402) is dynamically adjusted at step 406. Generally, the dynamic adjustment involves moving, resizing and/or adjusting the transparency of a window on the display screen that is displaying the remote video stream. For example, if heavy activity is detected on or adjacent the display screen of the first video conference endpoint, a size of a window included on the display of the first video conference endpoint may be reduced to dynamically adjust the presentation of the remote video stream. Alternatively, the transparency of the window could be increased or the window could be moved to a new location (even including another display screen or device in the environment).

In order to ensure that the remote video stream is presented in least obtrusive and most effective manner, the local endpoint is continually monitored for new activity at steps 408 and 410. Upon detecting new activity, the presentation of the remote video stream is dynamically and automatically adjusted. For example, as content on the display screen is erased, the remote video stream window may be enlarged or rendered more opaque. By comparison, if a display screen if filled with writing, a video window may be rendered transparent or moved to another display screen in the same room (e.g., another screen of a video endpoint, a mobile device, or any other computing device). Example algorithms for dynamically adjusting the presentation of the remote video stream are discussed in more detail below in connection with FIGS. 5-13. However, generally, the dynamic adjustments are intended to prevent portions of a display screen that include content (whether added locally or remotely, such as via a digital whiteboard) from being hidden during portions of a video conference session focused on content while ensuring that participants can effectively communicate during portions of the video conference session focused on conversation.

Figure 5:
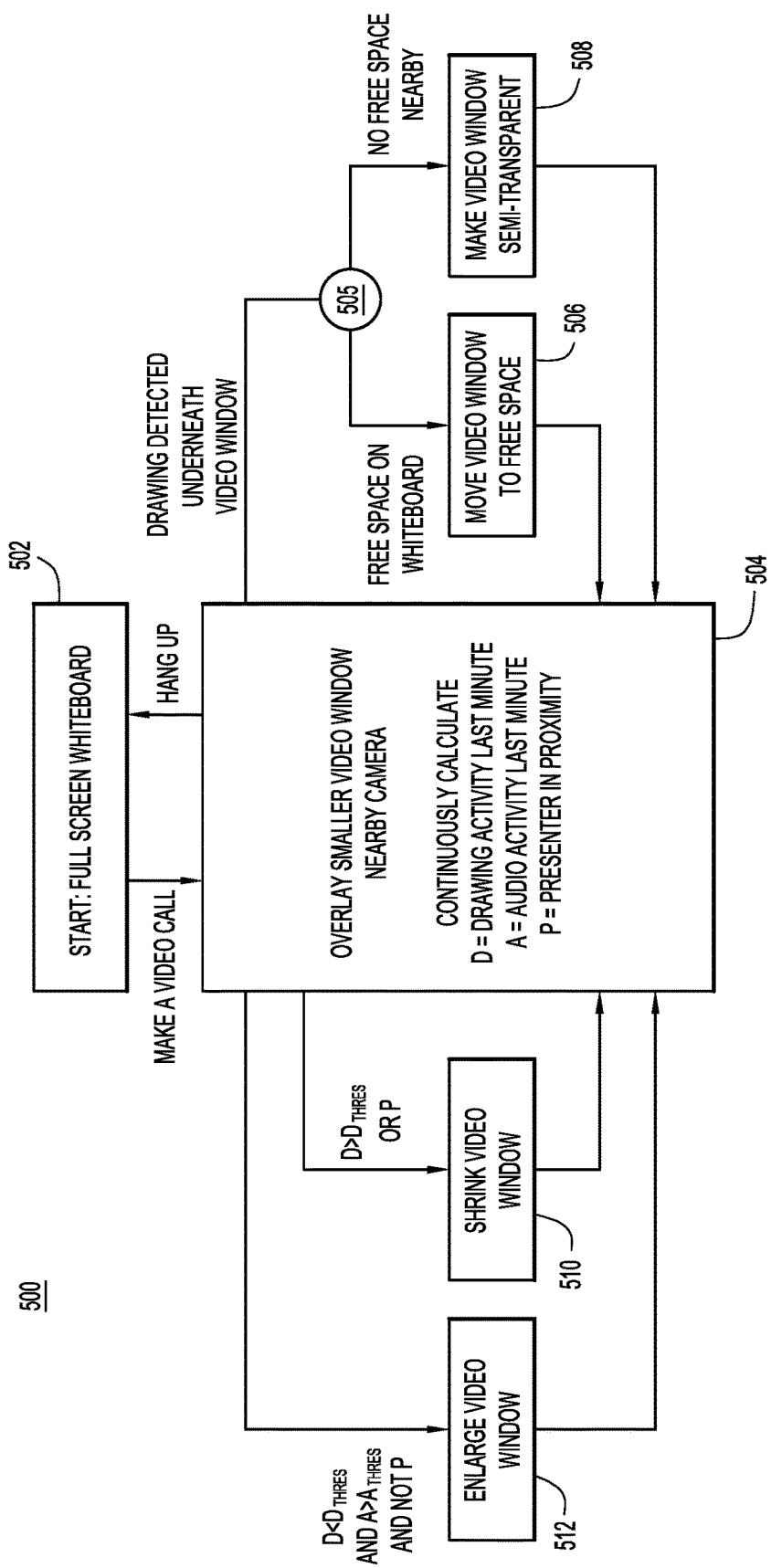
FIG. 5 is an operational flow diagram depicting operations for dynamically adjusting the presentation of a video stream, according to an example embodiment.

Now turning to FIG. 5, an operational flow diagram 500 depicting operations for dynamically adjusting presentation of a remote video stream is now described, according to an example embodiment. In the depicted example embodiment, the display screen is or presents an electronic whiteboard; however, the operations discussed in connection with FIG. 5 may apply to any display screen. Initially, at 502, the electronic whiteboard is provided over the entire display screen (e.g., in full screen). Then, as a video call is initiated with a remote video conference endpoint (a second video conference system), a window displaying a video stream from the remote video conference endpoint is generated and displayed on the local display screen at 504. Additionally, at 504, the local endpoint begins to analyze activity on or around the local endpoint.

The activity analysis performed at 504 monitors the drawing activity, audio activity, and the proximity of participants. In this particular embodiment, the activity analysis tracks drawing activity (D) in the last (most recent) minute, audio activity (A) in the last minute and whether the current presenter is in proximity (P) to the system (e.g., whether the current presenter at the local endpoint). However, in other embodiments, the time period need not be a minute and the drawing activity, audio activity, and presenter proximity may be calculated based on sensor input as an average over a time-sliding window, by processing the sensor input with neural networks, or in any other manner. Here the window is illustrated as one minute by way of example. Additionally, the drawing activity need not actually involve drawing and, instead, may include drawing lines or other geometric figures, writing letters, pointing to parts of the whiteboard, and any other interactions with the display. In at least some embodiments, the drawing activity may be at the local endpoint or the remote endpoint. For example, the drawing activity may be on any electronic whiteboard participating in a digital whiteboarding session. Still further, in some embodiments, participant proximity may be tracked together with or instead of presenter proximity since the presence of any participant close to a display screen may indicate a need to reduce the size of the video window.

Based on the monitoring/tracking, the display screen can be dynamically adjusted to best facilitate the current working environment. For example, when the local endpoint is being used as a whiteboard or other such collaboration screen (or even showing content that is the current focus of the video conference session, such as an active/playing video clip), the window displaying the remote video stream is dynamically adjusted so as not to obscure the display screen and disrupt screen activity (e.g., "whiteboarding"). Similarly, when the local endpoint is primarily used to allow for collaboration (e.g., discussion) with participants at the remote endpoint, the window displaying the remote video stream is dynamically adjusted to clearly show the participants at the remote endpoint.

More specifically, if during the activity analysis at 504, drawing is detected (at a local or remote endpoint) underneath the video window displaying the remote video stream (referred to hereinafter as the video window, for simplicity), a determination may be made at 505 as to whether free space exists on the display screen (e.g., by analyzing drawing activity from the current session). If so, the video window may be moved to the free space at 506. If no free space is available, the video window may be rendered semi-transparent at 508. Either way, subsequent to the adjustment, the monitoring may continue at 504. Consequently, if content is erased after making the video window semi-transparent, thereby creating free space, the video window may be rendered more opaque (less semi-transparent) and moved to the new free space.

At the same time, the activity analysis at 504 may also compare the drawing activity (D) and audio activity (A) to specific thresholds to determine the size of the window. The size of the window may also depend upon the presence (or absence) of a presenter at the endpoint. Generally, if a presenter is detected in the environment of the local endpoint, the presenter may not need to see participants at remote endpoints in a large window. Instead, the presenter is likely focused on material in hand and/or content on the display screen. Consequently, when the presenter is detected in the environment of the local endpoint, the size of the video window may be reduced at 510. On the other hand, if the drawing activity exceeds a certain threshold, this may indicate that active drawing/writing/endpoint interaction is taking place and the local participants will likely want to focus on the content on the display screen. Consequently, the video window may be shrunk (e.g., reduced in size) at 510. In some embodiments, the threshold may be a predetermined amount of activity, such as a predetermined amount of writing over a predetermined amount of time. Additionally or alternatively, the threshold may be determined as a statistical measure, such as a standard deviation above a rolling average.

If, instead, the drawing activity is below the threshold, the analysis may also check the audio activity and presenter location before enlarging the video window. If the drawing activity is below the drawing threshold, the audio activity is below an audio threshold (which may be predetermined or determined in the same manner as the drawing threshold) and the presenter is not in the local environment, the video window may be enlarged at 512. Notably, in this embodiment, the video window is only enlarged when the drawing activity has slowed (indicating little or no drawing activity), the audio activity has slowed, and the presenter is not local. In this scenario, it is likely that the local participants are passive participants or viewers and, thus, it may be beneficial to provide the remote video stream (which may include a participant stream of the current presenter from a remote endpoint or a data stream of a remote whiteboard) in a large and easy to see video window. For example, this collection of detected activity may indicate that participants are sitting at a meeting table or walking away from the display. However, in some embodiments, additional factors may also be considered before increasing the size or transparency of the video window. For example, in some embodiments, the size and transparency of the video window may not be increased if a participant is detected standing close to the endpoint, since a participant (even if not active) in close proximity to a display screen is likely to be viewing content the display screen (in fact, in some embodiments, the size of the video window may be reduced when a participant is detected close to the display). By comparison, in some embodiments, if audio or drawing activity exceeds its threshold, it may be determined that the local participants are editing or discussing content displayed on the local display screen and, thus, the video window should not be enlarged. For example, as audio activity increases, this may indicate that an active discussion is occurring.

Now turning to FIG. 6, a flow chart 600 depicting operations for dynamically adjusting presentation of a remote video stream is now described, according to another example embodiment. In this particular embodiment, the type of adjustment is prioritized so that the video window is adjusted in the following order: 1) transparency adjustments; 2) size adjustments; and 3) moving the video window. In the depicted flow chart, a single adjustment is applied to the video window if the adjustment will clearly show the content on the display screen (which may be referred to as local content) and/or more clearly show the video window (e.g., to remediate a prior change after whiteboarding has ceased). However, this is merely an example and in other embodiments, some combination of adjustments may be utilized to dynamically adjust the display screen to clearly show all of the subject matter displayed thereon (both local content and remote content in the video window).

More specifically, at 602, the local endpoint environment is monitored for new activity. In some embodiments, the new activity will need to satisfy a certain threshold, at 603, in order to avoid constantly adjusting the display screen. For example, the new activity (or activity level) may be required to persist over a certain period of time, such as thirty seconds or one minute. When new activity is detected for a time exceeding the threshold, a determination is made, at 604, as to whether the new activity is proximate to or on the local endpoint, insofar as "proximate" indicates that the activity is close or adjacent to the endpoint and "on" indicates that there is activity on the display screen, whether the activity was initiated at the local endpoint or a remote endpoint (e.g., remote annotations on a digital whiteboard). If the new activity is proximate to or on the local endpoint, determinations are made at 606 and 610 as to how to adjust the video window to better display the local content. In contrast, if the new activity is disposed a distance from the local endpoint (e.g., not proximate or on), determinations are made at 622, 626, and 630 as to how to better display the video window on the display screen of the local endpoint.

When the content on the display screen of the local endpoint is prioritized (e.g., because activity is detected proximate to or on the local endpoint), a determination is first made at 606 as to whether increasing the transparency of the remote video window will clearly show the content on the local endpoint. If so, the transparency of the video window is increased at 608. If not, consideration is next given to decreasing the size of the video window at 610. If decreasing the size of the video window will clearly show the content on the local endpoint, then the size may be dynamically adjusted at step 612. Finally, if neither transparency adjustments nor size adjustments will clearly show the local content, the video window may be moved to a new location or position at 614. In some embodiments, the new position may be on the same display screen; however, in other embodiments, the new position may be on a new display screen altogether. For example, the video window could be displayed on another computing device in the environment and/or another display screen included on a multi-screen video conference endpoint. Regardless, in this embodiment, moving the video window is deprioritized because moving a video window is the most significant alteration and may, in some instances, disrupt the video conference by appearing to jump on the display screen. Instead, subtle or graduate adjustments to the size and transparency may be prioritized.

By comparison, when the content in the video window is prioritized (e.g., because activity is detected at a distance away from the local endpoint and/or an absence of activity is detected on the display screen, thereby indicating little to no activity on or with the display screen itself), the video window is adjusted to provide a better view of the video stream displayed in the video window. In some embodiments, the video window may be enlarged beyond is original size; however, in this particular embodiment, the video window is simply returned to its original orientation as activity moves away (e.g., is no longer proximate) from the local endpoint and/or ceases on the local endpoint. Again, adjustments to the transparency or size are preferred to moving the video window and, thus, the viability of these adjustments is assessed first. In particular, at 622, the transparency of the video window is assessed to determine if the video window is semi-transparent. If the video window is semi-transparent, the transparency is remediated at step 624 to clearly show the video stream in the video window. If not, the size is assessed at 626 and remediated at 628 if necessary. If the size and transparency are both sufficient (e.g., the video window is at its original size and transparency), the location of the window is reviewed at 630 and remediated at 632 if necessary. In other embodiments, multiple adjustments may be made to the video window to remediate multiple previous adjustments and provide a video window that is easy to see; however, as mentioned, in this particular embodiment only a single adjustment is made and, thus, only a single re-adjustment needs to be made when activity moves away form the local endpoint.

Now turning to FIGS. 7-13 an example display screen 702 is shown in various layouts or display configurations, as examples of the adjustments described herein. The display screen includes local content 704 in the form of writing on an electronic whiteboard and a video window 706 displaying a participant stream from a remote endpoint. Initially, in the layout 700 shown in FIG. 7, the video window 706 is shown in the top center of the display screen 702, covering a portion of the content 702. This configuration (locating the video window in a top center location) is a frequently used with video conference endpoints because it increases eye contact and relevance. However, as shown, the top center of the display screen 702 is also frequently used by local participants during whiteboarding and other such activity.

In FIG. 8, layout 800 illustrates one potential solution to the problem illustrated in FIG. 7. In this layout, the whiteboard area is shrunk so that content 704 and the video window 706 are provided in non-overlapping areas of the display screen 702. However, as shown at 802, this solution wastes a large portion of the display screen 702. The techniques provided herein reduce or eliminate wasted space, as is shown in FIGS. 9-13.

Figure 9:
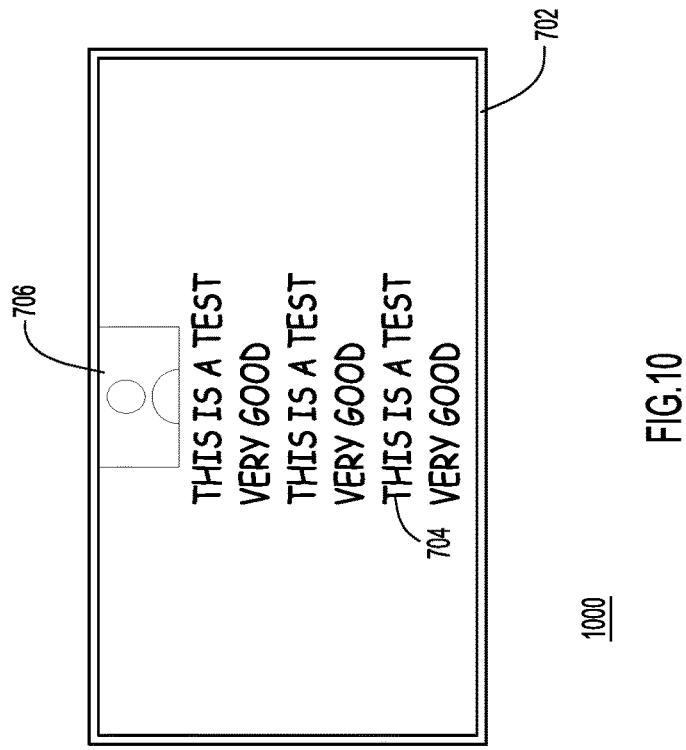
FIGS. 9-13 each illustrate the whiteboard of FIG. 7 displaying an adjusted participant stream, according to an example embodiment.
Figure 10:
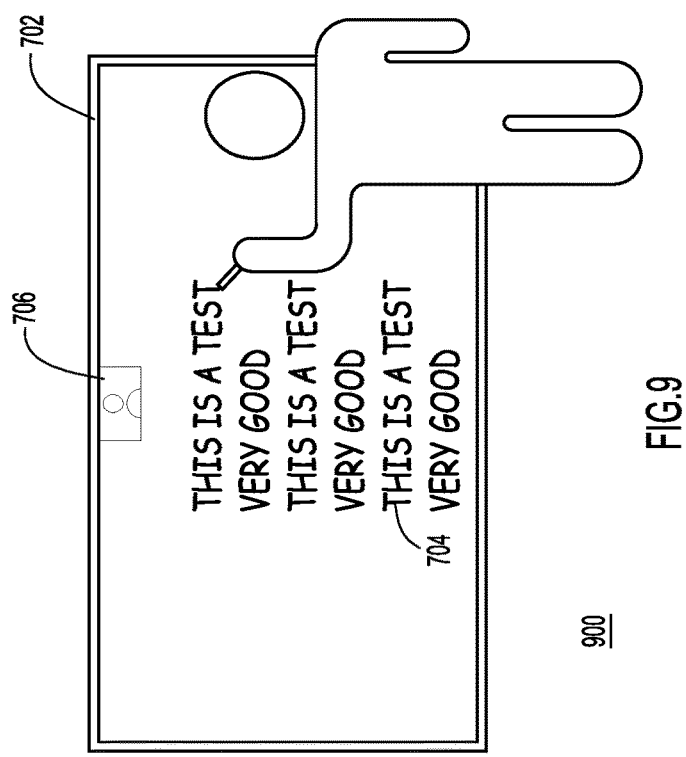
Figure 11:
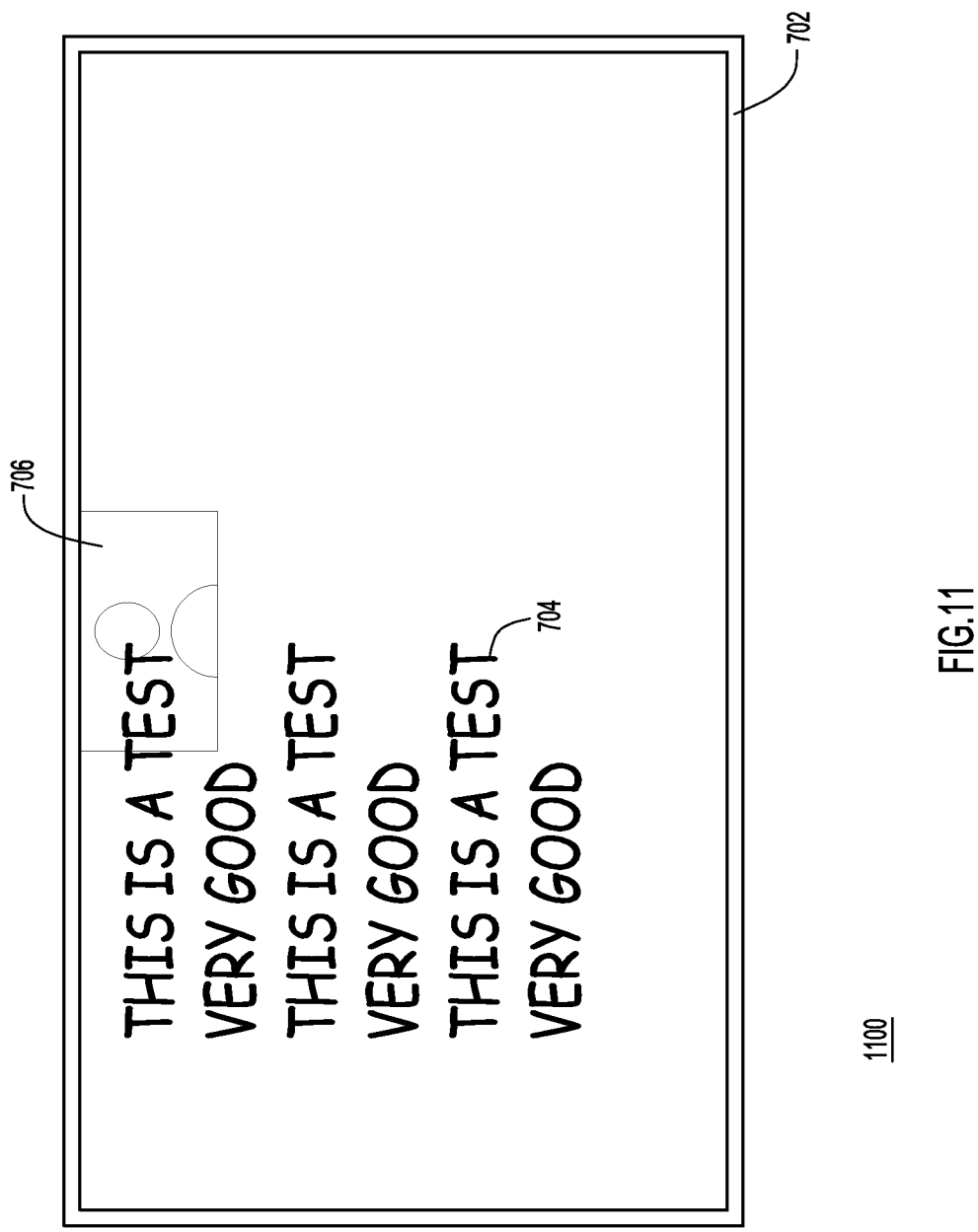
Figure 12:
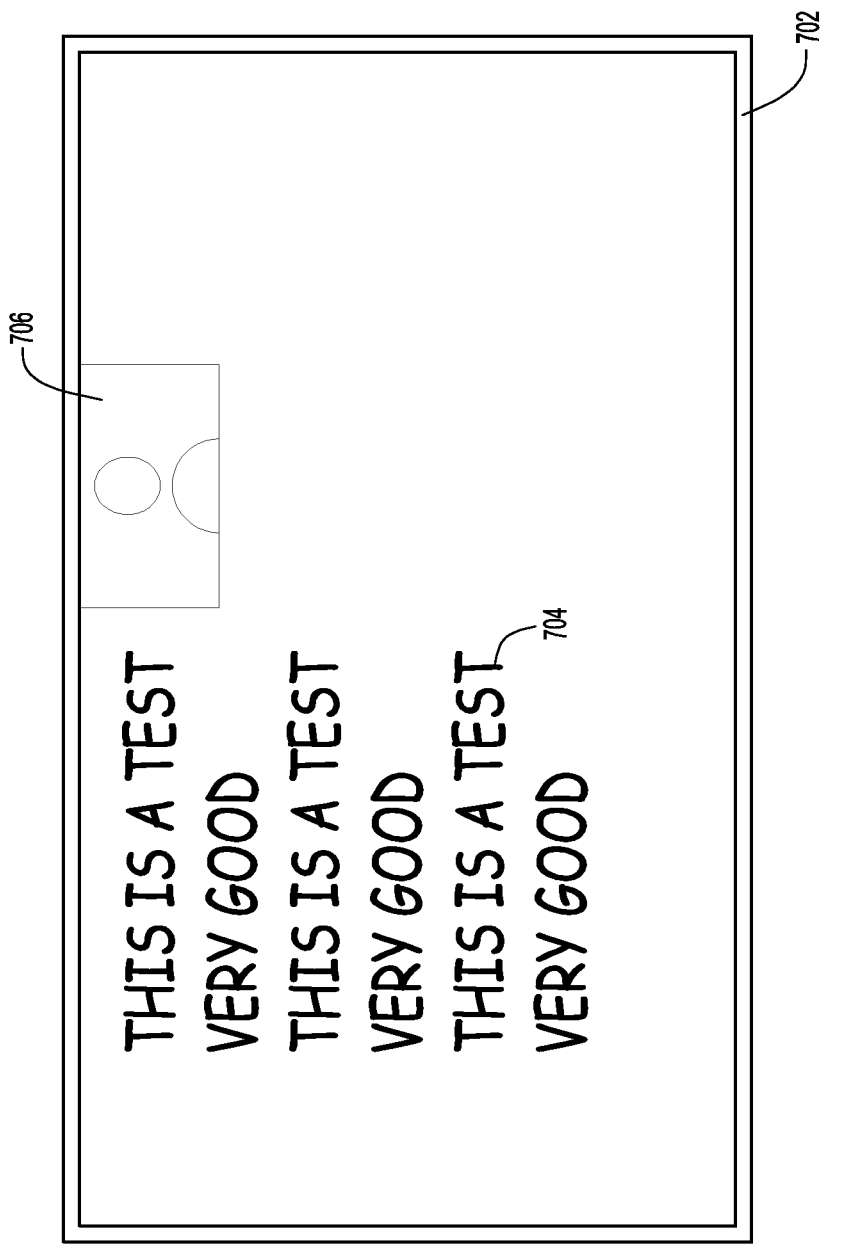
Figure 13:
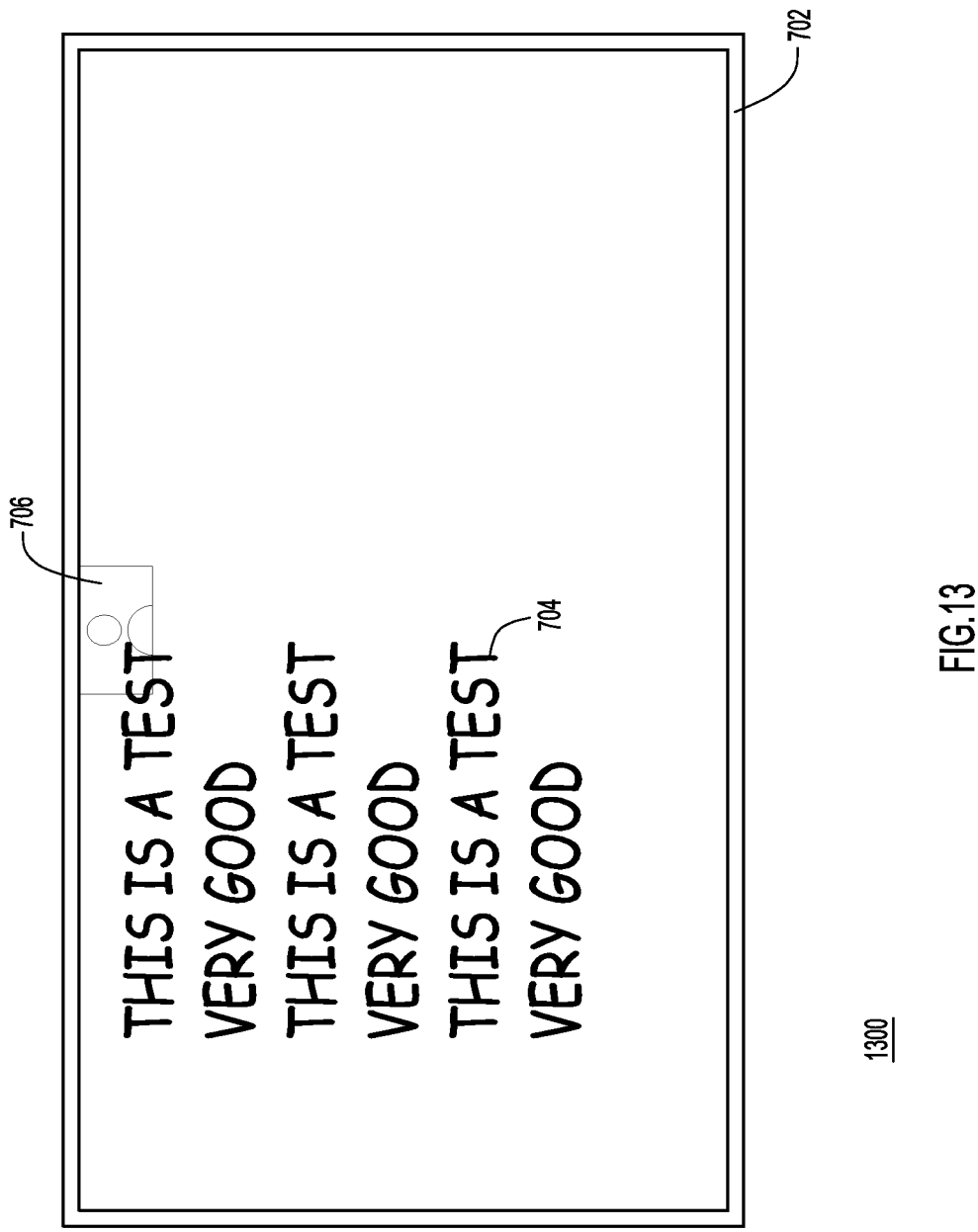

In FIGS. 9-13, the video window 706 is shown subsequent to dynamic adjustments. In FIG. 9, the display screen 702 is shown in a layout 900 where the video window 706 has been decreased in size, thereby exposing more of the display screen and all of the content 704. By comparison, in FIG. 10, the display screen 702 is shown in a layout 1000 where the size of the window 706 is increased (enlarged), perhaps as activity in proximity of the local endpoint decreases to better show the participant stream in the video window 706. In FIG. 11, a layout 1100 is provided where the video window 706 is still enlarged, but is now transparent. Consequently, although the content 704 extends into the same area as the video window 706, the content 704 can be still be seen by local participants. In FIG. 12, a layout 1200 is provided where the video window 706 is still enlarged, but is moved into a free space on the display screen 702. As is discussed above, this configuration may be used when free space is available on the display screen and/or when transparency or size adjustments would fail to show the content 704. Finally, in FIG. 13, a layout 1300 is provided where the video window is shrunk and transparent. In some embodiments, this layout may be utilized when constant activity is detected proximate the local endpoint, thereby indicating constant whiteboarding during the video conference session.

The techniques provided herein provide a number of advantages. Most notably, the techniques provide use of the full screen of a display during collaboration sessions. This is particularly useful for whiteboarding video conference sessions, as it allows whiteboarding users to see their drawings and writings while also communicating with remote users. In fact, the techniques provided herein optimize the dynamic adjustments to enlarge and/or clearly show the whiteboard when a user is actively whiteboarding and enlarge and/or clearly show a remote video feed when a user has stepped away from the display and is discussing the contents (or any other subject) with remote participants and/or viewing a remote collaborative display. Put another way, the techniques provided herein maximize the screen area of a video conference display system for digital whiteboarding while significantly reducing the adverse effects of a video window overlay for the face-to-face conversation with a remote participant.

To summarize, in one form, a method is provided comprising: receiving, at a first video conference endpoint, a video stream from a second video conference endpoint; detecting activity in an environment of the first video conference endpoint or an environment of the second video conference endpoint with at least one physical activity sensor; and dynamically adjusting a presentation of the video stream at the first video conference endpoint based on the detected activity.

In another form, an apparatus is provided comprising: a network interface configured to provide network connectivity on behalf of a first video conference endpoint; a display; one or more physical activity sensor configured to detect activity in an environment of the first video conference endpoint or an environment of the second video conference endpoint; and a processor coupled to the network interface, the display, and the one or more physical activity sensor, the processor being configured to: receive, at the first video conference endpoint, a video stream from a second video conference endpoint; and dynamically adjust a presentation of the video stream on the display based on the detected activity.

In yet another form, a non-transitory computer-readable storage media is provided that is encoded with software comprising computer executable instructions and when the software is executed operable to: receive, at a first video conference endpoint or an environment of the second video conference endpoint, a video stream from a second video conference endpoint; detect activity in an environment of the first video conference endpoint with at least one physical activity sensor; and dynamically adjust a presentation of the video stream at the first video conference endpoint based on the detected activity The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    receiving, at a first video conference endpoint, a video stream from a second video conference endpoint;
    displaying a presentation of the video stream on a display of the first video conference endpoint;
    displaying, on the display of the first video conference endpoint, collaborative content generated by at least one of the first video conference endpoint and the second video conference endpoint;
    detecting activity in an environment of the first video conference endpoint or an environment of the second video conference endpoint with one or more physical activity sensors; and
    based on the activity detected by the one or more physical activity sensors, dynamically adjusting the presentation of the video stream on the display of the first video conference endpoint with respect to the collaborative content to selectively obscure the collaborative content or the presentation.

2. The method of claim 1, wherein the video stream is a first video stream, the presentation is a first presentation, and the method further comprises:
    receiving a second video stream from a third video conference endpoint;
    displaying a second presentation of the second video stream on the display of the first video conference endpoint; and
    dynamically adjusting the second presentation of the second video stream based on the activity detected by the one or more physical activity sensors.

3. The method of claim 1, wherein dynamically adjusting further comprises at least one of:
    adjusting a transparency of a window containing the presentation of the video stream; and
    adjusting a size of the window.

4. The method of claim 1, wherein dynamically adjusting further comprises:
    adjusting the presentation when the activity detected by the one or more physical activity sensors satisfies a threshold.

5. The method of claim 1, wherein the one or more physical activity sensors include at least one of a proximity sensor, a microphone, a camera, a display of the first video conference endpoint, and a display of the second video conference endpoint and the activity detected by the one or more physical activity sensors is at least one of:
    drawing activity occurring on the display of the first video conference endpoint or on the display of the second video conference endpoint;
    audio activity detected by the microphone occurring proximate the first video conference endpoint; and presenting activity detected by the proximity sensor in the environment of the first video conference endpoint.

6. The method of claim 1, wherein dynamically adjusting further comprises:
adjusting the presentation incrementally over time.

7. The method of claim 1, wherein dynamically adjusting further comprises:
adjusting the presentation of the video stream to uncover obscured portions of the collaborative content when the one or more physical activity sensors detect whiteboarding activity in the environment of the first video conference endpoint.

8. An apparatus comprising:
a network interface configured to provide network connectivity on behalf of a first video conference endpoint;
a display;
one or more physical activity sensors configured to detect activity in an environment of the first video conference endpoint; and
a processor coupled to the network interface, the display, and the one or more physical activity sensors, the processor being configured to:
receive a video stream from a second video conference endpoint;
display a presentation of the video stream on the display;
display, on the display, collaborative content generated by at least one of the apparatus and the second video conference endpoint; and
based on the activity detected by the one or more physical activity sensors, dynamically adjust the presentation of the video stream on the display with respect to the collaborative content to selectively obscure the collaborative content or the presentation.

9. The apparatus of claim 8, wherein the video stream is a first video stream, the presentation is a first presentation, and the processor is further configured to:
receive a second video stream from a third video conference endpoint;
display a second presentation of the second video stream on the display; and
dynamically adjust the second presentation of the second video stream based on the activity detected by the one or more physical activity sensors.

10. The apparatus of claim 8, wherein in dynamically adjusting, the processor is further configured to:
adjust a transparency of a window containing the presentation of the video stream; and
adjust a size of the window.

11. The apparatus of claim 8, wherein in dynamically adjusting, the processor is further configured to:
adjust the presentation when the activity detected by the one or more physical activity sensors satisfies a threshold.

12. The apparatus of claim 8, wherein the one or more physical activity sensors include at least one of a proximity sensor, a microphone, a camera, a display of the first video conference endpoint, and a display of the second video conference endpoint and the activity detected by the one or more physical activity sensors is at least one of:
drawing activity occurring on the display of the first video conference endpoint or on the display of the second video conference endpoint;
audio activity detected by the microphone occurring proximate the first conference endpoint; and
presenting activity detected by the proximity sensor in the environment of the first video conference endpoint.

13. The apparatus of claim 8, wherein in dynamically adjusting, the processor is further configured to:
adjust the presentation incrementally over time.

14. A non-transitory computer-readable storage media encoded with software comprising computer executable instructions and when the software is executed operable to:
receive, at a first video conference endpoint, a video stream from a second video conference endpoint;
display a presentation of the video stream on a display of the first video conference endpoint;
display, on the display of the first video conference endpoint, collaborative content generated by at least one of the first video conference endpoint and the second video conference endpoint;
detect activity in an environment of the first video conference endpoint or an environment of the second video conference endpoint with one or more physical activity sensors; and
based on the activity detected by the one or more physical activity sensors, dynamically adjust the presentation of the video stream on the display of the first video conference endpoint with respect to the collaborative content to selectively obscure the collaborative content or the presentation.

15. The non-transitory computer-readable storage media of claim 14, wherein the instructions operable to dynamically adjust the presentation are further operable to:
adjust a transparency of a window containing the presentation of the video stream; and
adjust a size of the window.

16. The non-transitory computer-readable storage media of claim 14, wherein the video stream is a first video stream, the presentation is a first presentation, and the instructions are further operable to:
receive a second video stream from a third video conference endpoint;
display a second presentation of the second video stream on the display of the first video conference endpoint; and
dynamically adjust the second presentation of the second video stream based on the activity detected by the one or more physical activity sensors.

17. The non-transitory computer-readable storage media of claim 14, wherein the one or more physical activity sensors include at least one of a proximity sensor, a microphone, a camera, a display of the first video conference endpoint, and a display of the second video conference endpoint and the activity detected by the one or more physical activity sensors indicates at least one of:
drawing activity occurring on the display of the first video conference endpoint or the display of the second video conference endpoint;
audio activity detected by the microphone occurring proximate the first video conference endpoint; and
presenting activity detected by the proximity sensor in the environment of the first video conference endpoint.

18. The non-transitory computer-readable storage media of claim 14, wherein the instructions operable to dynamically adjust the presentation are further operable to:
adjust the presentation incrementally over time.

19. The non-transitory computer-readable storage media of claim 14, wherein the instructions operable to dynamically adjust the presentation are further operable to:
adjust the presentation when the activity detected by the one or more physical activity sensors satisfies a threshold.

20. The non-transitory computer-readable storage media of claim 14, wherein the instructions operable to dynamically adjust the presentation are further operable to:
 adjust the presentation of the video stream to uncover obscured portions of the collaborative content when the one or more physical activity sensors detect whiteboarding activity in the environment of the first video conference endpoint.

\* \* \* \* \*